May 21, 1940.  R. H. McCARROLL  2,201,405

PISTON

Filed Sept. 7, 1939

Inventor
Russell H. McCarroll
By Bacon & Thomas
Attorneys

Patented May 21, 1940

2,201,405

UNITED STATES PATENT OFFICE 2,201,405

PISTON

Russell H. McCarroll, Dearborn, Mich.

Application September 7, 1939, Serial No. 293,859

5 Claims. (Cl. 309—11)

The present invention relates to a thin walled, relatively lightweight piston and to a new steel alloy especially adapted for use in making such piston for internal combustion engines.

It is well known that aluminum alloy pistons have several advantages over pistons made of other metals, when used in an internal combustion engine, in that the metal itself is an exceptionally good heat conductor and, therefore, the transfer of heat from one part of the piston to another part and to the cylinder wall is rapid enough to avoid undesirable preignition even though used in a high compression engine. Moreover, aluminum being very light in weight, its inertia is comparatively low. This minimizes the reciprocating strains on the wrist pin and connecting rod bearings and also permits a minimum of counterweighting on the crankshaft to produce a running balance. These advantages are sufficiently important to make an aluminum piston preferable to the conventional cast iron piston for high speed engine use. However, the above advantages can only be enjoyed with certain accompanying inherent disadvantages. For example, aluminum with its high coefficient of heat transfer has a high coefficient of expansion, much higher than that of the cast iron or steel cylinder in which the same is ordinarily used. Hence, an aluminum piston skirt must be fitted with undesirable excess clearance at the outset, or else fitted with normal clearance and provided with slots to take care of excess expansion, or be made elliptical, or provided with expanders to prevent the piston from slapping during the warming-up period of the motor, or equipped with invar struts or expansion controlling bands to prevent slapping and "freezing" of the piston in the cylinder, etc.

Another disadvantage of the use of aluminum pistons is their comparatively high coefficient of friction when used in a cast iron cylinder, resulting in excessive piston wear. This excess friction leads to a still further disadvantage in that the cylinder surface attains a somewhat higher temperature than when cast iron pistons are used, often causing "heating up" of the engine and distortion of the cylinder bore. A still further disadvantage inherent in aluminum alloy pistons is that the metal is comparatively soft so that the piston ring grooves "pound out" or increase in width appreciably after only a few hundred hours of use. In addition to the pounding out of the ring grooves, the side surfaces of the ring lands are subjected to rapid wear resulting from the normal "breathing" action of the piston rings. The impairment of the ring lands produces blow-by and oil pumping. The wear of the piston skirt referred to above eventually results in "wobbling" of the piston on its piston pin while it is being reciprocated in the cylinder, and such wobbling action wears off the flat outer periphery of the piston rings to form a convex surface that will glide on, rather than scrape off, an oil film so that, obviously, considerable oil pumping results. The wear on the lands of the ring groove also promotes the passing of oil around the ring onto the cylinder wall above the rings. To prevent blow-by and oil pumping, it is essential that there be a minimum of clearance between the ring grooves and the piston rings, and aluminum pistons have been found to be inherently incapable of maintaining the minimum clearances initially provided for a prolonged period of time.

The principal objection to cast iron pistons is their excessive weight, resulting in relatively low mileage per gallon of gasoline; and sluggish starting, as compared with the quick get-away which characterizes automobiles provided with light weight pistons. On the other hand, the wearing qualities and other properties of cast iron pistons are well known to far exceed those of aluminum alloy pistons.

Accordingly, one of the principal objects of the invention is to provide a light weight piston which combines all of the advantages of ferrous pistons and many of the advantaes of aluminum alloy pistons, without including any of the disadvantages inherent in aluminum alloy pistons.

A more specific object of the invention is to fulfill the long felt need for a piston having the desired long wearing properties of ferrous metal and which piston does not weigh appreciably more than an aluminum alloy piston of corresponding size.

The above objectives have been realized as the result of a great many years of research work directed to the development of a steel alloy having free flowing properties, when in a molten state, peculiarly adapting the same for casting pistons and other bodies with very thin walls, and which alloy at the same time is of such character as to permit such pistons or other bodies to be cast with a minimum of "rejects" and to be readily machined.

Heretofore, the making of thin-walled piston castings was beset by almost insurmountable difficulties, not only because of the lack of a suitable ferrous metal having sufficient fluidity in a molten state to flow freely into the narrow spaces of the mold, but also because of the great difficulty of preventing the formation of blow holes, and because of still other difficulties in casting, all of which resulted in such a large proportion of unusable castings as to render the founding of exceptionally thin-walled pistons impractical from the standpoint of mass production.

The aforementioned research work has also included the development of a process of heat treatment designed to impart strength and good wearing qualities to pistons and other bodies made of the new steel alloy here concerned. The method of heat treating pistons cast from the novel alloy is disclosed and claimed in co-pending application Serial No. 134,735, filed April 3, 1937.

While pistons constructed in accordance with the present invention have the advantage that they can be readily finished by machining or grinding, it is well understood that no matter how smooth a finish may be secured upon the wearing surface of a piston by ordinary machining operations, or even by grinding, the metal seems to have a surface sufficiently rough to constitute a grave source of danger to the cylinder during the initial period of operation and until the surface is worn smooth. This characteristic of machined or ground surfaces on pistons brought about the common practice of operating an engine at a speed of not over 40 or 50 miles per hour for the first few hundred miles in order to "break it in." Various expedients have been resorted to in an effort to avoid this tedious breaking-in process. In more recent years it has become common practice to apply a plating of tin to pistons to facilitate running-in and prevent seizing or scoring. The use of tin plating on a cast iron piston is disclosed in the patent to Summers 1,856,272. Summers also suggests the use of silver and cadmium in addition to such metals as copper and lead.

The use of tin has overcome the difficulty of seizing and scoring to a certain extent. However, tin is not entirely satisfactory because it is subject to embrittlement upon encountering the high operating temperatures of modern high speed, high compression engines and, moreover, its low melting point does not adapt it to withstand such temperatures for any appreciable length of time. Another disadvantage of tin plated cast iron pistons is that the tin plating readily scuffs off the piston skirt at the high points of contact with the cylinder wall. Tin plating has the still further disadvantage of wearing off rapidly.

While the patent to Summers suggests the use of cadmium plating on a cast iron piston, and while cadmium has many known desirable advantages over tin from a heat and wear-resisting standpoint, it was not possible in prior piston constructions to use cadmium plating because cast iron and aluminum alloy pistons, which have been almost universally employed in engines, could not be successfully plated with cadmium. It was not until the present steel piston was developed that plating of a ferrous piston with cadmium became a practical possibility. For reasons unknown, cadmium appears to have a peculiar affinity for the alloy of which the present piston is made and tenaciously adheres thereto to provide a truly remarkable bearing surface on the piston which permits the piston to be operated in a new engine at substantially full speed.

Possibly the great adherence of cadmium to the piston of the present invention is explainable as due to the particular matrix of the new steel alloy which adapts the metal for taking a uniform, highly adherent deposit or coating of any metal by electroplating methods.

Additional advantages and objects of the invention will be apparent from the following description taken in connection with the drawing, in which.

Figure 1:
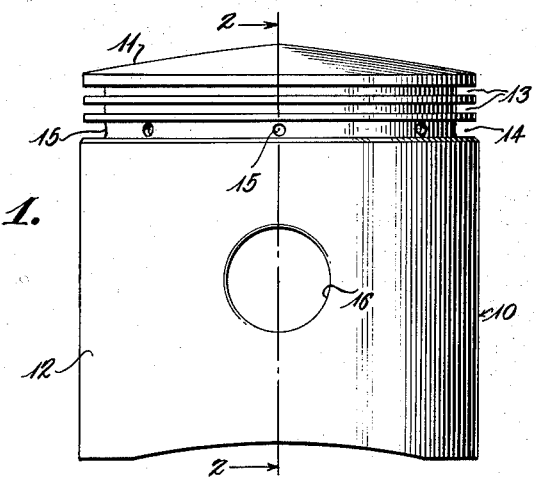
Figure 1 is an elevational view of a plated piston made in accordance with the present invention.
Figure 2:
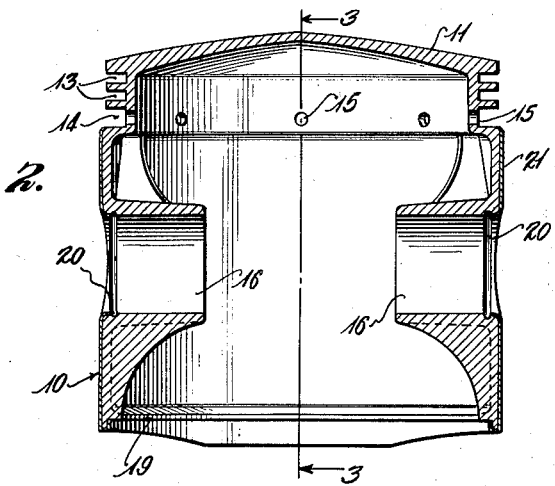
Figure 2 is a sectional view taken on the line 2—2 of Figure 1 illustrating the thin-walled construction of the head, skirt and piston, the thickness of the plating on the skirt being exaggerated.
Figure 3:
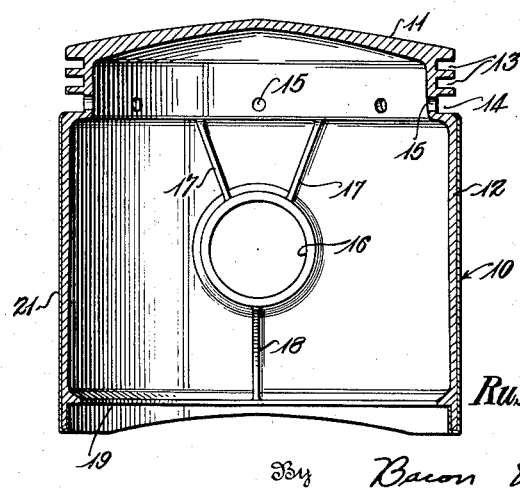
Figure 3 is a sectional view taken on the line 3—3 of Figure 2 similarly illustrating the thin-walled piston construction.

Referring now to the drawing, the piston is generally indicated by the numeral 10. The piston comprises a head portion 11 and a skirt portion 12. The portion of the piston adjacent the head may be provided with any suitable number of compression ring receiving grooves 13. If desired, the piston may also be provided with a groove 14 for an oil ring, and this groove may be intersected by a plurality of oil drain ports 15. The skirt 12 carries a pair of pin bosses 16 adapted to receive a wrist pin (not shown). The pin bosses 16 are braced relatively to the head by angular webs 17, and a substantially vertical web 18 below each of said pin bosses provides an additional brace with the skirt. The lower ends of the webs 18 merge into an annular reinforcing rib 19 adjacent the open end of the piston skirt. The pin bosses 16 may be grooved as indicated at 20 to receive a conventional wrist pin retainer (not shown). A thin film or layer 21 of cadmium is applied to the entire outer periphery of the skirt 12 between the ring groove 14 and the open end of the skirt, as is clearly shown in Figures 2 and 3.

The alloy of the present invention (the composition and heat treatment of which will be discussed more fully hereinafter) has been found to have a compressive elastic limit of approximately 110,000 pounds per square inch; an ultimate compressive strength of approximately 140,000 pounds per square inch; an ultimate tensile strength of approximately 100,000 pounds per square inch; and an ultimate shear strength of approximately 72,000 pounds per square inch. The foregoing properties of the present steel alloy considerably exceed the corresponding properties of cast iron and aluminum alloys and thus make it possible to form the head 11 of the piston much thinner than that which would be required in a cast iron or aluminum alloy piston of a similar size for a given engine. For example, an ordinary cast iron piston used under similar circumstances would require a piston head several times the thickness of that of the present piston in order to provide the necessary structural strength. An aluminum alloy piston head, of course, would of necessity be made even thicker than a cast iron head.

Even though the head 11 of the present piston is made thin, it is strong enough to withstand the stresses imposed thereon during operation, and in view of the good heat conductivity of the metal constituting the same, preignition does not occur. Tests show excellent results of no preignition with a piston having an outside diameter of approximately 3 inches, a skirt about 2½ inches long, and a finished head thickness from 0.09 to 0.13 inch operating in an engine having a compression ratio of approximately 6.5. The skirt walls of the above piston were originally cast with a thickness of 0.09 to 0.13 of an inch, or approximately $\frac{3}{32}$ to $\frac{1}{8}$ of an inch. After machining, the thickness of the skirt wall was reduced 0.03 to 0.035 of an inch, leaving the thickness of the skirt in the neighborhood of $\frac{1}{32}$ of an inch, which is unusually thin for a piston of the diameter stated.

Pistons of the dimensions given above are adapted to be cast by the latest sand casting methods. It will be understood, however, that casting of the piston is not restricted to such methods.

Compositions suitable for the piston material include proportions of elements falling within the following limits:

| | Percent |
|---|---|
| Carbon | 1.00 to 2.00 |
| Manganese | .50 to 1.50 |
| Silicon | .50 to 1.50 |
| Copper | 1.50 to 3.50 |
| Phosphorus maximum | .12 |
| Sulfur do | .16 |
| Iron | Balance |

However, extended manufacture of pistons in accordance with the present invention has shown that the best results are obtained with an alloy falling within the more narrow limits of the following analysis:

| | Percent |
|---|---|
| Carbon | 1.40 to 1.60 |
| Manganese | .60 to 1.00 |
| Silicon | .90 to 1.30 |
| Chromium | .08 to .15 |
| Phosphorus maximum | .10 |
| Sulfur do | .08 |
| Copper | 2.50 to 3.00 |
| Iron | Balance |

The alloy of the present invention has most exceptional properties with respect to its fluidity in the molten state and has produced many remarkable and unexpected results. For example, pistons made in accordance with the present invention are being cast at the rate of over fifty thousand per day and the scrap or rejects from this enormous production is practically negligible.

After the pistons have been cast, they are removed from the molds and subjected to a special heat treatment. This heat treatment comprises heating the castings to approximately 1650° F. for twenty minutes and then air cooling the same for thirty minutes to a maximum temperature of 1200° F. The castings are then reheated to 1400° F. and held at this temperature for approximately one hour, after which they are then slowly cooled to 1000° F., this last-mentioned cooling taking approximately one hour to accomplish, after which the castings are then air cooled to room temperature.

The above described heat treatment differs from the conventional normalizing heat treatment in that the purpose of the first step of the treatment is to break up the grains of the metal and start a secondary graphitization, and also to insure complete saturization of the matrix to form pearlite, such heat treatment being stopped after the castings have been at the critical point long enough to insure the above results but before there is any appreciable formation of flake graphite. The second step, or slow reheating and holding of the temperature at the lower 1400° F. point, insures complete graphitization of the excess carbon and the collection of such excess carbon into small nodules of temper carbon and also at the same time results in spheroidizing the pearlite; while the last slow cooling step prevents embrittlement of the metal and the production of a hard and unchilled casting.

The resultant matrix is a pearlite with copper in solution which results in improving the heat conductivity of the metal to such an extent that the cross-sectional thickness of the piston head may be reduced to substantitally that required to withstand the loads placed upon such head during operation in an engine. The high tensile strength of the alloy permits the head to be made very thin, much thinner than could be done with cast iron, and still be sufficient to withstand the stresses imposed thereon. The high heat conductivity favors a thin head construction and eliminates any danger of preignition.

It will be noted that the present steel alloy has a higher carbon content than the average steels contain. The heat treatment developed for parts made of such alloy is such as to cause the excess of carbon above that which would readily go into solution with the iron to be formed throughout the matrix as small nodules of temper carbon uniformly distributed throughout the entire matrix, thereby providing a matrix having the highly advantageous properties of a high grade steel.

A great advantage of the present alloy is its remarkable ability to receive an adherent plating of various metals and particularly cadmium which has a higher fusion point and greatly superior wearing qualities than tin.

A further very marked advantage of steel pistons constructed of the alloy of the present invention is that, due to the presence of the excess graphite in the form of temper carbon and also to the copper in solution in the matrix, the coefficient of friction, when used in a cast iron cylinder, is considerably less than that of cast iron on cast iron, or aluminum on cast iron. Consequently, less wear of the piston and cylinder walls occurs and less frictional heat is developed, thereby reducing the danger of destroying the essential oil film between the piston and cylinder.

After the pistons have been cast and heat treated, is described hereinbefore, they are machined to proper dimensions and are then cleaned in an electrolytic cleaner bath containing a solution of soda ash, trisodium phosphate and caustic potash. This solution or bath is maintained at a temperature of 200 to 210° F. with a current density of 50 to 60 amperes per square foot, 12 volts. An iron tank is used as an anode, and the pistons are kept submerged in the solution for a period of from 1 to 15 minutes, according to the condition of the work. The piston castings are then rinsed under cold running water and are next acid dipped in commercial muriatic acid; then subjected to another cold water rinse; next an alkali dip in 10% solution of soda ash; then another cold water rinse, after which they are placed in an electrolytic bath for the cadmium plating operation.

The plating bath consists of:

| | |
|---|---|
| Sodium cyanide ounces | 8 |
| Cadmium oxide do | 3½ |
| Caustic soda do | 3 |
| Corn syrup do | 1¾ |
| Water gallon | 1 |

A current density of 20 to 25 amperes per square foot, 6 volts, and a temperature of 100 to 110° F.

is maintained in the plating bath. Anodes of 99% cadmium are used and the time period of plating varies from 10 to 20 minutes, according to the articles to be plated and the thickness of deposit desired. After removal from the plating bath, the pistons are subjected to a cold water rinse with running water and then are thoroughly cleaned with hot water.

In the case of pistons, a layer of cadmium about 0.0005 of an inch in thickness is deposited on the skirt. Such layer of cadmium permits the steel piston to be fitted with 0.002 of an inch clearance, which is a closer fit than could be safely used if the piston was not plated. The use of cadmium plating entirely eliminates the danger of the piston seizing in or scoring new cylinder walls because the plating fills up the very small pits in the surface of the metal and presents a smooth surface. Due to the fact that cadmium is much softer than the alloy of the piston, it very quickly is forced into the irregularities of the surface of the metal almost immediately that the engine starts operating, and inasmuch as the cadmium is fairly resistant to wear, the protective coating formed by the cadmium lasts until the hard metal of the alloy has assumed a very smooth excellent wearing surface.

Even more remarkable and unexpected than the results already noted are the results obtained in the operation of an engine equipped with pistons of the present invention as compared with aluminum pistons, as indicated by the following table from page 54, Automotive Industries, January 11, 1936, showing averages of a number of careful dynamometer tests:

|  | Steel piston | Cam ground aluminum | Diamond turned aluminum | Diamond turned aluminum .001 undersize |
|---|---|---|---|---|
| Frictional heat gain not under power B. t. u | 56,700 | 64,500 | 63,300 | 56,800 |
| Heat gain under power 65 H. P. at 3,000 R. P. M. B. t. u. | 298,100 | 332,600 | 320,670 | 309,900 |
| Oil temp. not under power | 165 | 169 | 175 | 165 |
| Oil temp. under power | 206 | 210 | 203 | 200 |
| Fuel 65 H.P. at 3,000 R. P. M | 38.1 | 40.3 | 40.7 | 38.6 |
| Horsepower (max.) | 83.4 @ 3,600 | 75.7 @ 3,600 | 76.6 @ 3,600 | 81.1 @ 3,600 |
| Compression (max.) | 136.8 @ 2,000 | 138.1 @ 2,000 | 139.7 @ 2,000 |  |
| Fuel average full throttle lbs. H. P. hr | .631 | .656 | .669 | .635 |

As will be seen from the foregoing table, applicant's steel piston has many points of marked superiority over the aluminum piston in many respects, one of the most unusual being the increase of over 8 horsepower at maximum, as shown in the table.

The present application is a continuation-in-part of copending application Serial No. 134,735, filed April 3, 1937, now Patent No. 2,181,947.

It will be understood that the composition, heat treatment, and thickness of the piston and plating may be varied within limits without departing from the spirit of the invention and reasonably fall within the scope of the appended claims.

Having described my invention, what I desire to secure by Letters Patent of the United States is:

1. A piston for use in internal combustion engines formed of an alloy comprising: carbon 1.00 to 2.00 percent, manganese .50 to 1.50 percent, silicon .50 to 1.50 percent, copper 1.50 to 3.50 percent, sulfur .16 maximum percent, phosphorus .12 maximum percent, iron balance; said piston having a thin head and skirt and a layer of cadmium on the exterior of said skirt.

2. A piston for internal combustion engines formed of the following composition: carbon 1.40 to 1.60 percent, manganese .60 to 1.00 percent, silicon .90 to 1.30 percent, chromium .08 to .15 percent, phosphorus .10 maximum percent, sulfur .08 maximum percent, copper 2.50 to 3.00 percent, iron balance; said piston comprising a thin head and a skirt, said skirt having a layer of cadmium about 0.0005" thick on the exterior thereof.

3. A piston for internal combustion engines formed of the following composition: carbon 1.40 to 1.60 percent, manganese .60 to 1.00 percent, silicon .90 to 1.30 percent, chromium .08 to .15 percent, phosphorus .10 maximum percent, sulfur .08 maximum percent, copper 2.50 to 3.00 percent, iron balance; said piston comprising a head and a skirt, said skirt having a radial thickness of substantially $\frac{3}{32}$"; and a layer of cadmium on the exterior of said skirt substantially 0.0005" thick.

4. A piston as defined in claim 1, in which the skirt has a radial thickness of approximately $\frac{3}{32}$ of an inch.

5. A piston as defined in claim 1, in which the layer of cadmium on the exterior of the skirt has a radial thickness of approximately 0.0005".

RUSSELL H. McCARROLL.